Figure 1:
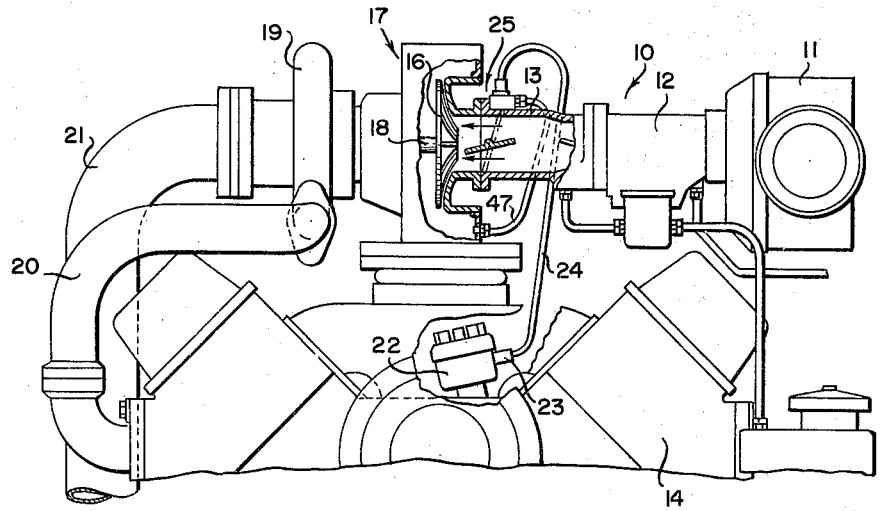

Aug. 31, 1965   M. A. SEIDEN   3,203,411
IGNITION TIMING CONTROL DEVICE
Filed April 17, 1964

INVENTOR.
Myron A. Seiden
BY *J. J. Soucek*
Attorney

Patent text page

3,203,411
IGNITION TIMING CONTROL DEVICE
Myron A. Seiden, Rochester, N.Y., assignor to General Motors Corporation, Detroit, Mich., a corporation of Delaware
Filed Apr. 17, 1964, Ser. No. 360,560
3 Claims. (Cl. 123—146.5)

This invention relates generally to internal combustion engines in which the fuel mixture is compressed and forced into the combustion chambers by a device commonly referred to as a supercharger. More specifically, it relates to the ignition timing regulation of supercharged engines of the type in which supercharger discharge pressure is used to advance ignition timing. It is common in conventional natural aspirated engines to provide means to automatically adjust the spark distributor to advance the timing in response to both engine speed and fuel induction system pressure. The speed responsive means provides the spark advance requirements under relatively heavy loads or high induction system pressures while low induction system pressure or light load spark advance requirements are met by the pressure responsive means in addition to the speed responsive means. This arrangement provides considerably advanced spark at light loads, i.e., low induction system pressure and results in better fuel economy. Providing light load spark advance is similarly desirable in a supercharged engine.

In the conventional engine, light load spark advance is accomplished by the use of an ignition timing adjuster responsive to pressure existing at some point in the fuel induction system such as the throttle bore. When the engine is adapted with a supercharger, in which the throttle is upstream from the compressor, the pressure existing in the fuel induction system on the inlet side of the compressor is at a lower pressure, i.e., more negative due to the pumping action of the compressor. The pumping action results in a relatively higher pressure on the discharge side of the compressor for all load conditions. However, the discharge pressure remains subatmospheric during light load and becomes greater than atmospheric only during full and nearly full load. Since additional spark advance is required only during light load, it is more desirable on the supercharged engine to connect the ignition timing adjuster to the discharge side of the compressor which is negative only during light load rather than upstream of the compressor where the pressure remains negative at all load settings. This arrangement accomplishes the desired result of additional spark advance only during light load.

The best "idle" or closed throttle performance is achieved when there is no light load spark advance. This condition is met in a conventional engine by placing the ignition timing adjuster in communication with the throttle bore just upstream of the throttle valve. When the throttle valve is closed the ignition timing adjuster is exposed to atmospheric pressure and there is no spark advance. In the supercharged engine this location is undesirable since it would result in excessive spark advance during heavy load due to the lower pressure in the throttle bore. Conversely, by using the compressor discharge pressure to regulate spark advance the desired part load characteristics are obtained but the best "idle" performance is lost since the compressor discharge pressure is subatmospheric at "idle" or closed throttle and results in spark advance.

Accordingly, it is an object of the present invention to provide additional spark advance at part load in an engine fitted with a supercharger in which the throttle is upstream from the compressor.

It is a further object of this invention to eliminate any spark advance when the engine is operated at "idle" or closed throttle.

Figure 2:
Figure 2:
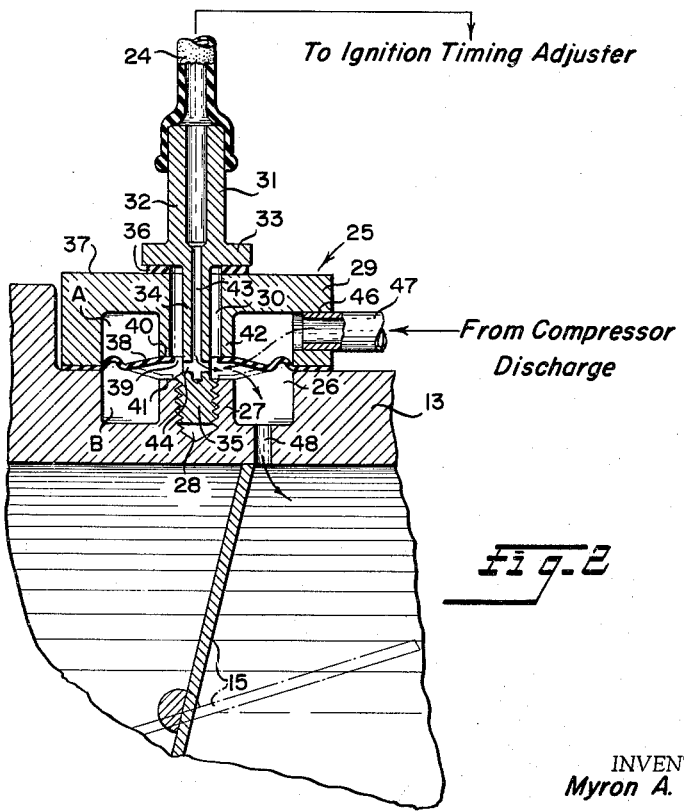

FIGURE 1 is a side elevation of an engine installation utilizing this invention in which a portion of the fuel induction system is broken away to more clearly show the relationship of the device to the system; and FIGURE 2 is a cross section of the ignition timing adjuster regulator used to accomplish the above objects.

Referring to FIGURE 1, a fuel induction system indicated generally at 10 includes an intake air cleaner 11, a carburetor 12, and a throttle valve housing 13. The quantity of fuel-air mixture entering the internal combustion engine 14 is regulated by a throttle valve blade 15 rotatably mounted within housing 13 in a known manner. A compressor 16 is mounted within a compressor discharge plenum 17 adjacent the throttle valve housing 13 and is driven through a shaft 18 by an exhaust driven turbine 19. Exhaust gases emitted from engine 14 are directed by conduit 20 to the turbine 19 and are subsequently expelled through an exhaust pipe 21. This turbine is disclosed as a preferred embodiment but other means for driving the compresor may be employed.

An ignition distributor 22 and a pressure responsive ignition timing adjuster 23 control the timing of engine cylinder ignition and may by of any type well known in the art. The ignition timing adjuster 23 is connected to one end of a line 24 and adjusts the distributor 22 to advance the spark delivered to the respective cylinders in an inverse proportion to the degree of pressure acting on the adjuster. That is, the more negative the pressure the more the spark is advanced while at atmospheric pressure or greater, the adjuster 23 is ineffective and provides no spark advance.

Referring now to FIGURE 2, the ignition timing adjuster regulator which is the subject of this invention is shown generally at 25 adjacent the throttle valve housing 13. The housing 13 is formed with an annular depression 26 and a central upstanding annular portion 27 having a threaded recess 28 formed therein. An inverted cup shaped casing 29 is provided with a central bore 30 and a depending annular portion 42. The depending portion 42 is axially aligned with and spaced from the upstanding portion 27 of housing 13. An attaching stud 31 serves to secure casing 29 to the housing 13 and includes a head portion 32, a flange 33 and a shank 34, terminating in a threaded end 35. A gasket 36 is disposed between the flange 33 and other wall 37 of the casing 29 to seal the bore 30 when stud 31 is threaded into upstanding portion 27 of the throttle valve housing 13.

A flexible diaphragm valve 38 is formed with a central aperture 39 and is held securely about its outer periphery between the casing 29 and the housing 13. The central aperture 39 of diaphragm 38 surrounds shank portion 34 of the attaching stud 31 and is limited in its upward movement by sealing engagement with an end wall 40 of depending annular portion 42. Similarly, downward movement of diaphragm 38 is limited by upper wall 41 of the upstanding annular portion 27. The arrangement provides two annular chambers A and B having a common wall provided by diaphragm 38.

Attaching stud 31 is formed with a central passage 43 that connects a cross bore 44 in shank 34 which is located intermediate the end walls 40 and 41. One end of the line 24 is attached to the ignition timing adjuster 23 and the other end is attached to head portion 32 of the stud 31 as shown in FIGURE 2. Line 24 is placed in communication with the central bore 43 and cross bore 44 by attaching the line to stud 31 in any suitable manner.

An opening 46 is formed in a wall of casing 29 adjacent the chamber A and receives one end of a line 47. The other end of line 47 is attached to the compressor discharge plenum 17 and in open communication with the interior thereof. Thus, when the diaphragm assumes a lower position and sealingly engages upper wall 41 of portion 27 as shown by broken lines in FIGURE 2, compressor discharge pressure acts on ignition timing adjuster 23 through the passages formed by line 47, chamber A, cross bore 44, central bore 43 and line 24.

When the diaphragm 38 is in an upper position as shown by solid lines in FIGURE 2, it sealingly engages wall 40 of portion 42 to shut off chamber A from the ignition timing adjuster and places chamber B in communication with the ignition timing adjuster 23. A spark port 48, located slightly anteriorly of throttle blade 15 when the throttle blade is closed, connects chamber B to the interior of the throttle valve housing 13. Therefore, when chamber B is in communication with the ignition timing adjuster 23 the adjuster is under the influence of pressure existing within throttle valve housing 13. In this case, the passage of air to adjuster 23 is established by spark port 48, chamber B, cross bore 44, central bore 43 and line 24.

In operation, the device performs as follows: At all settings of the throttle blade 15, except fully closed as shown in FIGURE 2, the compressor discharge pressure will be greater in absolute terms than the pressure existing in throttle valve housing 13. This is the case whether the compressor discharge pressure is subatmospheric as during part throttle settings or in excess of atmospheric pressure as during relatively full throttle settings. Hence, at all throttle settings except fully closed the pressure existing in chamber A will always be greater than that existing in chamber B so that the diaphragm 18 will assume the depressed position shown by the broken lines in FIGURE 2 and the compressor discharge pressure, whether positive or negative, will act on the ignition timing adjuster 23. The ignition timing adjuster 23 is arranged to advance the ignition timing only when it is being acted on by a vacuum, i.e., when the pressure is subatmospheric. Therefore, as the pressure becomes more negative, the spark is advanced to a greater degree. When the pressure acting on the diaphragm is atmospheric or in excess of atmospheric pressure, the ignition timing adjuster 23 moves the ignition distributor to the full retard or no spark advance setting. Thus, spark advance by the adjuster 23 is accomplished only during part load when the compressor discharge pressure is subatmospheric. As the throttle setting is increased the compressor discharge pressure passes above atmospheric and no further spark advance takes place. However, conventional systems are provided with centrifugal flyweights which provide spark advance responsive to engine speed so that some mechanical spark advance is provided although the compressor discharge is in the positive range.

In order to provide the optimum idling characteristics when the throttle is closed as shown in FIGURE 2, it is essential that the spark advance be allowed to go to the full retard position. The spark port 48 is positioned immediately upstream of the throttle blade 15 so that the spark port and chamber B will be exposed to atmospheric pressure when the throttle is closed. Since the compressor discharge pressure in chamber A is subatmospheric at closed throttle, the pressure is greater in chamber A than in chamber B and the diaphragm 18 will move to its upper position thus placing the bore 43 in communication with atmospheric pressure. In turn the ignition timing adjuster 23 will move the ignition distributor to the full retard position and, accordingly, there will be no spark advanced at "idle" or closed throttle.

This device simply and automatically provides, in a supercharged internal combustion engine, an ignition timing adjuster regulator which provides part load spark advance responsive to the compressor discharge pressure and further assures no spark advance at the closed throttle setting.

It should be understood, of course, that the foregoing disclosure relates only to a preferred embodiment of the invention and that it is intended to cover all changes and modifications of the example of the invention herein chosen for the purposes of the disclosure, which do not constitute departures from the spirit and scope of the invention.

What is claimed is:

1. In an internal combustion engine of the type having a throttle valve housing, a throttle valve in said housing, a supercharger compressor mounted downstream from said housing, an ignition distributor and a pressure responsive ignition timing adjuster: the improvement comprising; an ignition timing adjuster regulator, an apertured diaphragm valve within said regulator, a first abutment mounted within said regulator adjacent the peripheral edge of said aperture and adapted to sealingly engage one side of said diaphragm valve when said valve is moved into engagement therewith, a second abutment formed within said regulator and spaced from said first abutment, said second abutment being adjacent the peripheral edge of said aperture and adapted to sealingly engage the other side of said diaphragm valve when said valve is moved to a second position, first conduit means connecting one side of said diaphragm valve to the discharge side of said supercharger compressor, second conduit means placing the other side of said diaphragm valve in communication with the interior of said throttle valve housing, and third conduit means connecting said ignition timing adjuster and the interior of said regulator, whereby when said diaphragm valve assumes said first position said ignition timing adjuster is under the influence of pressure existing within said throttle valve housing and when said diaphragm valve assumes said second position said ignition timing adjuster is under the influence of pressure existing on the discharge side of said supercharger compressor.

2. In an internal combustion engine of the type having a throttle valve housing, a throttle valve in said housing, a supercharger compressor mounted downstream from said housing, an ignition distributor, and a pressure responsive ignition timing distributor: the improvement comprising; an ignition timing adjuster regulator mounted on said throttle valve housing, said housing having an annular depression in an outer wall thereof forming an upstanding central portion, an inverted cup-shaped casing attached to said housing adjacent said depression and having a depending portion spaced from said upstanding portion, a central bore formed in said casing and said depending portion, a centrally apertured diaphragm secured about its outer periphery between said housing and said casing and movable within limits defined by said depending portion of said casing and said upstanding portion of said throttle valve housing, an attaching stud threadedly secured at one end to said upstanding portion of said housing, said stud having a shank portion extending through said diaphragm aperture and central bore of said casing, said stud also having an enlarged head portion sealingly engaging said casing, a central axial passage formed in said head and said shank portion of said stud terminating in a cross passage in the vicinity of said diaphragm aperture and intermediate said depending portion of said casing and said upstanding portion of said housing, a first conduit connecting said central passage with said ignition timing adjuster, a spark port formed in said throttle valve housing adjacent and upstream of said throttle valve when said throttle valve is in a closed position so as to place one side of said diaphragm and the interior of said throttle valve housing in communication, a second conduit connecting the discharge side of said compressor and the other side of said diaphragm, whereby when said throttle valve is closed said diaphragm is moved to a first position to place said ignition timing adjuster in communication with the interior of said throttle valve housing and in all settings of open throttle said diaphragm is moved to a second position to place the ignition timing adjuster in communication with the discharge side of said supercharger compressor.

3. In an internal combustion engine of the type having a throttle valve housing, a throttle valve in said housing, a supercharger compressor mounted downstream from said housing, an ignition distributor and a pressure responsive ignition timing adjuster: the improvement comprising; an ignition timing adjuster regulator having a diaphragm valve mounted within said regulator and formed with an aperture, first stop means surrounding said aperture and adapted to sealingly engage one side of said diaphragm when said diaphragm is moved to a first position, second stop means spaced from said first stop means, said second stop means surrounding said aperture and adapted to sealingly engage the other side of said diaphragm when said diaphragm is moved to a second position, first connecting means placing one side of said diaphragm in communication with the discharge side of said compressor, second connecting means placing the other side of said diaphragm in communication with the interior of said throttle valve housing, third connecting means placing said ignition timing adjuster in communication with the interior of said regulator intermediate said stops whereby said adjuster is placed in communication with one side of said diaphragm when said diaphragm is moved to said first position and said adjuster is placed in communication with the other side of said diaphragm when said diaphragm assumes said second position.

References Cited by the Examiner

UNITED STATES PATENTS

| | | | |
|---|---|---|---|
| 2,383,898 | 8/45 | Udale | 123—117 |
| 2,538,377 | 1/51 | Ostling | 123—117 |
| 2,559,859 | 7/51 | Elliot et al. | 123—117 |

RICHARD B. WILKINSON, *Primary Examiner.*